United States Patent
Chmiel et al.

(10) Patent No.: US 10,051,637 B2
(45) Date of Patent: Aug. 14, 2018

(54) METHOD, APPARATUS AND COMPUTER PROGRAM PRODUCT FOR ENHANCED CONTROL CHANNEL USAGE IN CARRIER AGGREGATION

(71) Applicant: Nokia Solutions and Networks Oy, Espoo (FI)

(72) Inventors: Mieszko Chmiel, Wroclaw (PL); Simon Goedecke, Blaubeuren (DE); Carolin Huppert, Beimerstetten (DE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/228,547

(22) Filed: Aug. 4, 2016

(65) Prior Publication Data
US 2017/0048869 A1 Feb. 16, 2017

(30) Foreign Application Priority Data
Aug. 14, 2015 (EP) .................................... 15181100

(51) Int. Cl.
*H04W 4/00* (2018.01)
*H04W 72/04* (2009.01)
*H04L 5/00* (2006.01)

(52) U.S. Cl.
CPC ......... *H04W 72/0493* (2013.01); *H04L 5/001* (2013.01); *H04L 5/0053* (2013.01); *H04W 72/0413* (2013.01); *H04W 72/0446* (2013.01)

(58) Field of Classification Search
CPC ......... H04W 72/0493; H04W 72/0413; H04W 72/0446; H04L 5/0053; H04L 5/001
See application file for complete search history.

(56) References Cited

U.S. PATENT DOCUMENTS

2007/0275729 A1* 11/2007 Kashima ............... H04W 16/02
455/453
2014/0219267 A1* 8/2014 Eyuboglu ........... H04W 56/001
370/350
(Continued)

FOREIGN PATENT DOCUMENTS

WO    WO 2009/143384 A2    11/2009
WO    WO 2011/057037 A2    5/2011

OTHER PUBLICATIONS

3GPP TS 36.211 V12.5.0 (Mar. 2015), "$3^{rd}$ Generation Partnership Project; Technical Specification Group radio Access Network; Evolved Universal Terrestrial Radio Access (E-UTRA); Physical channels and modulation (Release 12)", 136 pgs.
(Continued)

*Primary Examiner* — Afshawn M Towfighi
(74) *Attorney, Agent, or Firm* — Harrington & Smith

(57) ABSTRACT

The present invention addresses a method, apparatus and computer program product for managing control channel usage in Carrier Aggregation, which implement defining a time reuse factor for a Physical Uplink Control Channel resource on a Primary Cell for enabling time multiplexing the subframes of the resource, and assigning a Physical Uplink Control Channel resource element to a requesting User Equipment by using colliding resources in different subframes, wherein the time reuse factor is variably set based on at least one of the number of requesting User Equipments and the individual traffic needs of the requesting User Equipment.

21 Claims, 6 Drawing Sheets

(56) References Cited

U.S. PATENT DOCUMENTS

2014/0237259 A1* 8/2014 Karabinis ................ H04L 9/00
    713/189
2014/0341018 A1* 11/2014 Bhushan ........... H04W 28/0289
    370/230

OTHER PUBLICATIONS

3GPP TS 36.212 V12.4.0 (Mar. 2015), "3$^{rd}$ Generation Partnership Project; Technical Specification Group Radio Access network; Evolved Universal Terrestrial radio Access (E-UTRA); Multiplexing and channel coding (Release 12)", 94 pgs.

3GPP TS 36.213 V12.5.0 (Mar. 2015), "3$^{rd}$ Generation Partnership project; Technical Specification Group Radio Access (E-UTRA); Physical layer procedures (Release 12)", 239 pgs.

* cited by examiner

METHOD, APPARATUS AND COMPUTER PROGRAM PRODUCT FOR ENHANCED CONTROL CHANNEL USAGE IN CARRIER AGGREGATION

FIELD OF THE INVENTION

The present invention generally relates to wireless communication networks, and more specifically relates to a method, apparatus and computer program product for improving control channel usage in Carrier Aggregation.

BACKGROUND

Mobile data transmission and data services are constantly making progress, wherein such services provide various communication services, such as voice, video, packet data, messaging, broadcast, etc. In recent years, Long Term Evolution LTE™, and in particular LTE-Advanced, has been specified, which uses the Evolved Universal Terrestrial Radio Access Network E-UTRAN as radio communication architecture according to 3GPP specification.

Carrier Aggregation CA is one of the key features of LTE-Advanced, which enables operators to create larger carrier bandwidths for LTE services by combining separate spectrum allocations.

The present invention basically relates to the field of Carrier Aggregation CA, which is currently specified in e.g. 3GPP LTE Release 10 and enhanced in 3GPP LTE Release 11 regarding LTE Advanced (LTE-A). As already indicated above, CA allows increasing the transmission/reception bandwidth by aggregating cells (a.k.a. Component Carriers).

In general, CA introduces the concepts of a Primary cell (PCell) and Secondary cell(s) (SCell). A user equipment UE which is capable for CA selects a PCell, and one or plural SCell(s) may be allocated to the CA-capable UE by the radio resource control RRC. The activation/deactivation of these SCells is controlled by the media access control MAC layer. The SCells may operate on the same frequency band as the PCell, or on a different band.

That is, in order to allow a user equipment UE to use the additional cell(s), the secondary cell(s) SCell(s) first need to be added by RRC and then activated by MAC. The prominent benefits of Carrier Aggregation include increased peak data rates, possibility to aggregate fragmented spectrum and fast load balancing.

More specifically, the present invention relates to the usage of Physical Uplink Control Channel (PUCCH) format 3 (F3) and PUCCH format 1b with channel selection (F1bwcs) as specified in 3GPP TS [36.211, 36.212 and 36.213]. The new PUCCH formats were introduced in 3GPP LTE Release 10 for the purpose of UE feedback for Carrier Aggregation.

The new PUCCH formats are mandatory to be used when the UE is aggregated with one or more SCells.

According to the above specifications, a base station eNB assigns four PUCCH F3/F1bwcs resources (or four resource pairs) per CA-capable UE by L3 RRC. Then, in a given transmission time interval TTI when the UE is scheduled in the downlink on SCell(s), only one of the four resources (or one resource pair) is selected and indicated to the UE by L1/L2 DCI (downlink control information)/PDCCH signalling (e.g. via the "TPC command for PUCCH" field in the DCI/downlink PDCCH assignment).

Thereby, the 3GPP related constrains are, in view of the PUCCH F1bwcs, if a UE uses a PUCCH F1bwcs resource (or a resource pair) in a given TTI to feedback ACK/NACK(s) on a given cell with the PCell role, then no other UE can use this resource (or a resource pair) in the same TTI on the same cell with the PCell role (otherwise an over-the-air resource collision would occur and the UL feedback fails). Further, in view of PUCCH F3, if a UE uses a PUCCH F3 resource in a given TTI to feedback ACK/NACK(s) on a given cell with the PCell role, then no other UE can use this resource in the same TTI on the same cell with the PCell role. If a UE gets a PUCCH F3 resource assigned by a downlink assignment due to downlink transmission on an SCell in a TTI, then the UE needs to get exactly the same resource by the downlink assignment corresponding to downlink transmission on additional SCell(s) in the same TTI (otherwise the UE will treat the multiple downlink assignments (due to downlink transmission on multiple SCell) as inconsistent downlink PDCCH information and the downlink transmission fails).

It is apparent that PUCCH F3/F1bwcs resource overbooking will be used by practical implementations upon the configuration of the resources by RRC for many UEs. For example, without overbooking if a unique resource is assigned for each UE during SCell(s) configuration then 100 UEs configured with SCell(s) and PUCCH F3 would require 20 (5 PUCCH F3 resources per UL PRB are possible) UL PRBs to be used just for PUCCH F3 (25 UL PRBs are available in case of a 20 MHz cell). Note that 100 UEs configured with SCell(s) per PCell is the current Nokia implementation, however, already now higher numbers are requested by operators including the extreme case when all UEs in the cell are configured with SCell(s).

Additionally, on the one hand, a high number of UEs per PCell with activated SCell(s) and scheduled per TTI is required by operators, and, on the other hand, a high number of SCell candidates per PCell is required by operators.

The above requirements and constrains pose the problem of an efficient PUCCH F3/F1bwcs resource assignment which is the scope of this invention.

Hence, an optimization of the control channel usage in Carrier Aggregation is required.

SUMMARY OF THE INVENTION

Therefore, in order to overcome the drawbacks of the prior art, it is an object underlying the present invention to provide enhanced control channel usage in Carrier Aggregation.

In particular, it is an object of the present invention to provide a method, apparatus and computer program product for enhanced control channel usage in Carrier Aggregation.

This object is achieved by a method, apparatus and computer program product as defined in the independent claims.

According to a first aspect of the present invention, there is provided a method for managing control channel usage in Carrier Aggregation, comprising defining a time reuse factor and a time reuse pattern for a Physical Uplink Control Channel resource on a Primary Cell for enabling time multiplexing the subframes of the resource, and assigning a Physical Uplink Control Channel resource element to a requesting User Equipment by using colliding resources in different subframes, wherein the time reuse factor and the time reuse pattern are variably set based on at least one of the number of requesting User Equipments and the individual traffic needs of the requesting User Equipment.

According to a second aspect of the present invention, there is provided an apparatus including a function for managing control channel usage in Carrier Aggregation, comprising at least one processor, and at least one memory for storing instructions to be executed by the processor, wherein the at least one memory and the instructions are configured to, with the at least one processor, cause the apparatus at least to define a time reuse factor for a Physical Uplink Control Channel resource on a Primary Cell for enabling time multiplexing the subframes of the resource, and to assign a Physical Uplink Control Channel resource element to a requesting User Equipment by using colliding resources in different subframes, wherein the time reuse factor is variably set based on at least one of the number of requesting User Equipments and the individual traffic needs of the requesting User Equipment According to a third aspect of the present invention, there is provided a computer program product comprising computer-executable components which, when the program is run, are configured to carry out the method according to the first aspect.

Advantageous further developments or modifications of the aforementioned exemplary aspects of the present invention are set out in the dependent claims.

According to certain embodiments of the present invention, a higher time reuse factor is an integer multiple of a lower time reuse factor.

According to certain embodiments of the present invention, each Physical Uplink Control Channel resource element is uniquely associated with a Physical Uplink Control Channel resource, a predefined time reuse pattern and a time reuse factor.

Thereby, according to certain embodiments of the present invention, the time reuse patterns are preset so as to enable time hopping, wherein the period of time hopping is time reuse factor dependent or independent of the time reuse factor. In this regard, a longer time hopping period may be an integer multiple of a shorter time hopping period, and the time reuse patterns of different time reuse factors may be time synchronized.

According to certain embodiments of the present invention, the Physical Uplink Control Channel resources are organized in a tree structure, wherein the corresponding levels of the tree are created by lowering the time reuse factor, each element in the tree is uniquely associated with a Physical Uplink Control Channel resource, a predefined time reuse pattern and a time reuse factor, and at least one of Physical Uplink Control Channel resource and time reuse pattern is different across all elements on a given level, each requesting User Equipment is allocated to one element of the tree for a defined periodic and/or event based time duration, and different requesting User Equipments have elements allocated on the same and/or on different levels of the tree.

Thereby, according to certain embodiments of the present invention, collisions across elements on different levels of the tree are avoided by prohibiting allocating the same Physical Uplink Control Channel resource to User Equipments on different levels of the tree, and/or by prohibiting allocating any child element on any lower level if a parent element has been allocated on any higher level.

Further, according to certain embodiments of the present invention, different User Equipments are primarily allocated to different tree levels based on a metric, wherein the metric considers at least one of requests of a number of the User Equipments to be scheduled on its Secondary Cell(s), the User Equipment buffer, the User Equipment radio conditions, the load of the User Equipment's Secondary Cell(s). If there is no suitable element found for a User Equipment on this tree level, the next lower level is checked.

Further, according to certain embodiments of the present invention, some or all assigned User Equipments are upgraded to a higher tree level if all of the child elements including all lower levels of this higher level element are not allocated to any other User Equipment.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
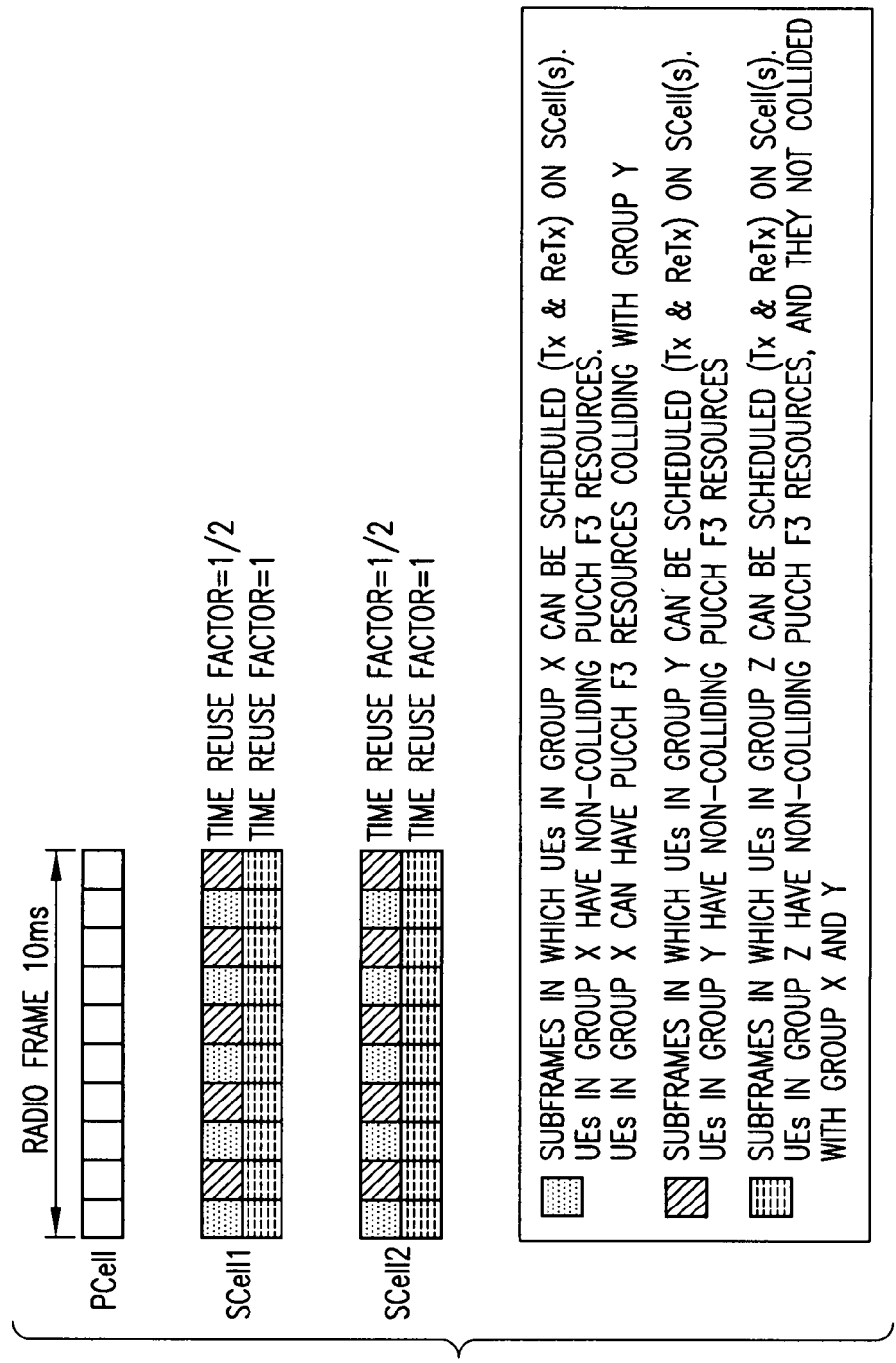
FIG. 1 shows the principle of the invention.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or, in particular, LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as evolved NodeB's (eNB; i.e. base station in LTE/LTE-A environment), user equipments UE (e.g. mobile phone, smart phone, Computer, etc.), controllers, interfaces, etc, and in particular any equipment used in the provision of a telecommunications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

According to the invention, a time reuse factor is defined for PUCCH resource(s) on the SCell(s) so that the collision of the resources is avoided by time multiplexing and using colliding resources in different subframes.

The time reuse factor can be variable and PCell-specific or UE-specific so that the available scheduling occasions can be adapted to the number of UEs and/or their individual traffic needs.

The principle of the invention is illustrated in FIG. 1. FIG. 1 exemplarily shows a radio frame of 10 ms, in which a PCell and two SCells (SCell1; SCell2) are assigned. Each of the SCells is depicted with a time reuse factor of ½ (0.5) and the time reuse factor 1.

Figure 2:
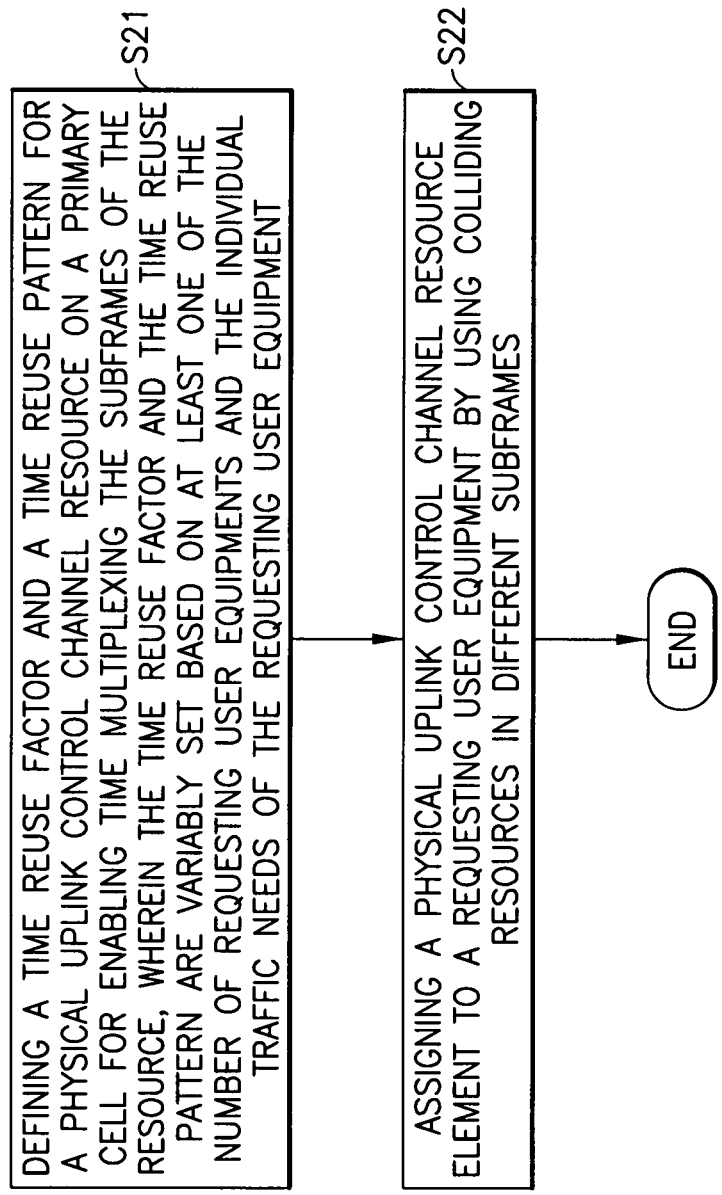
FIG. 2 illustrates a method performed in a network element for managing control channel usage in Carrier Aggregation according to certain embodiments of the invention.

The plain shaded subframes indicate subframes in which UEs in group X can be scheduled (Tx&ReTx) on SCell(s). UEs in group X have non-colliding PUCCH F3 resources. UEs in group X can have PUCCH F3 resources colliding with group Y The obliquely patterned subframes indicate subframes in which UEs in group Y can be scheduled (Tx&ReTx) on SCell(s). UEs in group Y have non-colliding PUCCH F3 resources Further, the dotted patterned subframes indicate subframes in which UEs in group Z can be scheduled (Tx&ReTx) on SCell(s). UEs in group Z have non-colliding PUCCH F3 resources, and they not collided with group X and Y FIG. 2 shows a method for managing control channel usage in Carrier Aggregation according to some example versions of the disclosure.

In Step S21, a time reuse factor for a Physical Uplink Control Channel resource on a Secondary Cell is defined for enabling time multiplexing the subframes of the resource, wherein the time reuse factor is variably set based on at least one of the number of requesting User Equipments and the individual traffic needs of the requesting User Equipment.

Figure 3:
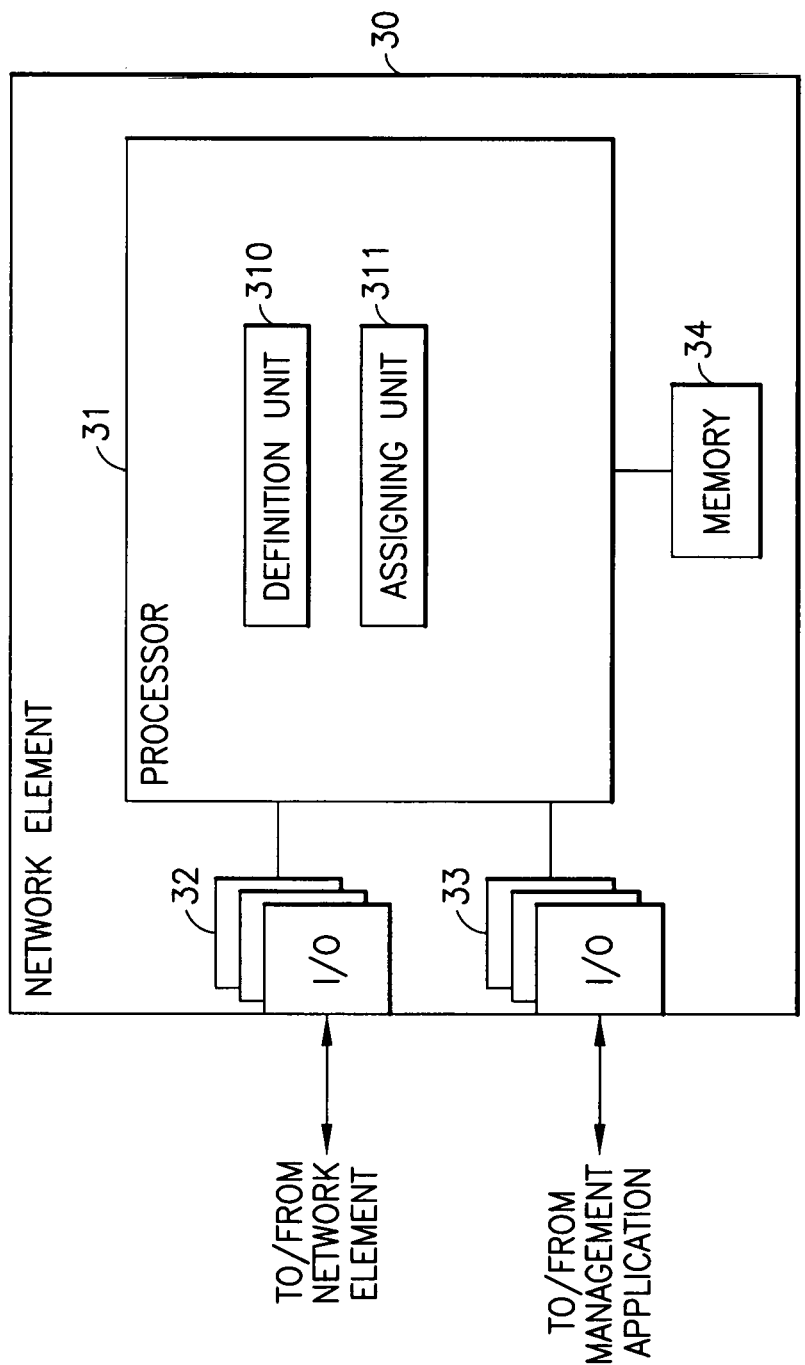
FIG. 3 depicts a general structure of an apparatus comprised in a network element including a function for managing control channel usage in Carrier Aggregation according to certain embodiments of the invention.

In Step S22, a Physical Uplink Control Channel resource element is assigned to a requesting User Equipment by using colliding resources in different subframes In FIG. 3 a diagram illustrating a configuration of an element comprised in a network element implementing a function for managing control channel usage in Carrier Aggregation according to some example versions of the disclosure is shown. The embodiment may be carried out in or by the network element. It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 3 shown in FIG. 3 may comprise a processing function, control unit or processor 31 such as a CPU or the like, which is suitable for executing instructions given by programs or the like related to the network element control procedure.

The processor 31 is configured to execute processing related to the above described improved control channel usage in Carrier Aggregation. In particular, the processor 31 comprises a sub-portion 310 as a definition unit configured to define a time reuse factor for a Physical Uplink Control Channel resource on a Secondary Cell for enabling time multiplexing the subframes of the resource, wherein the time reuse factor is variably set based on at least one of the number of requesting User Equipments and the individual traffic needs of the requesting User Equipment. The portion 310 may be configured to perform processing according to S21 of FIG. 2. Furthermore, the processor 31 comprises a sub-portion 311 usable as a assigning unit configured to assign a Physical Uplink Control Channel resource element to a requesting User Equipment by using colliding resources in different subframes. The portion 311 may be configured to perform processing according to S22 of FIG. 2.

Reference signs 32 and 33 denote transceiver or input/output (I/O) units (interfaces) connected to the processor 31. The I/O units 32 may be used for communication with the network element. The I/O units 33 may be used for communicating with a management application. Reference sign 34 denotes a memory usable, for example, for storing data and programs to be executed by the processor 31 and/or as a working storage of the processor 31.

Figure 4A:
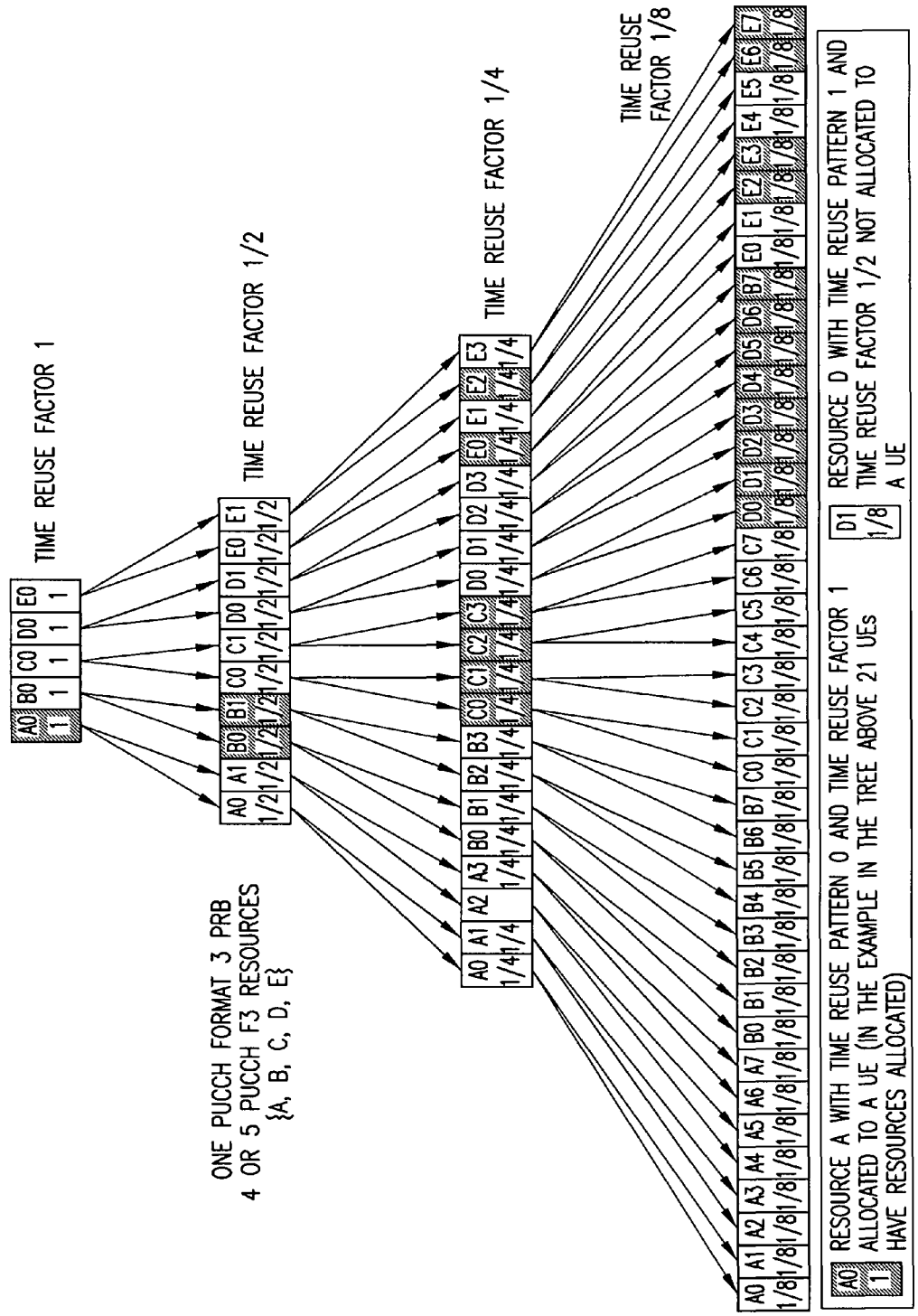
FIG. 4A shows an example of a PUCCH resource tree according to certain embodiments of the invention.
Figure 4B:
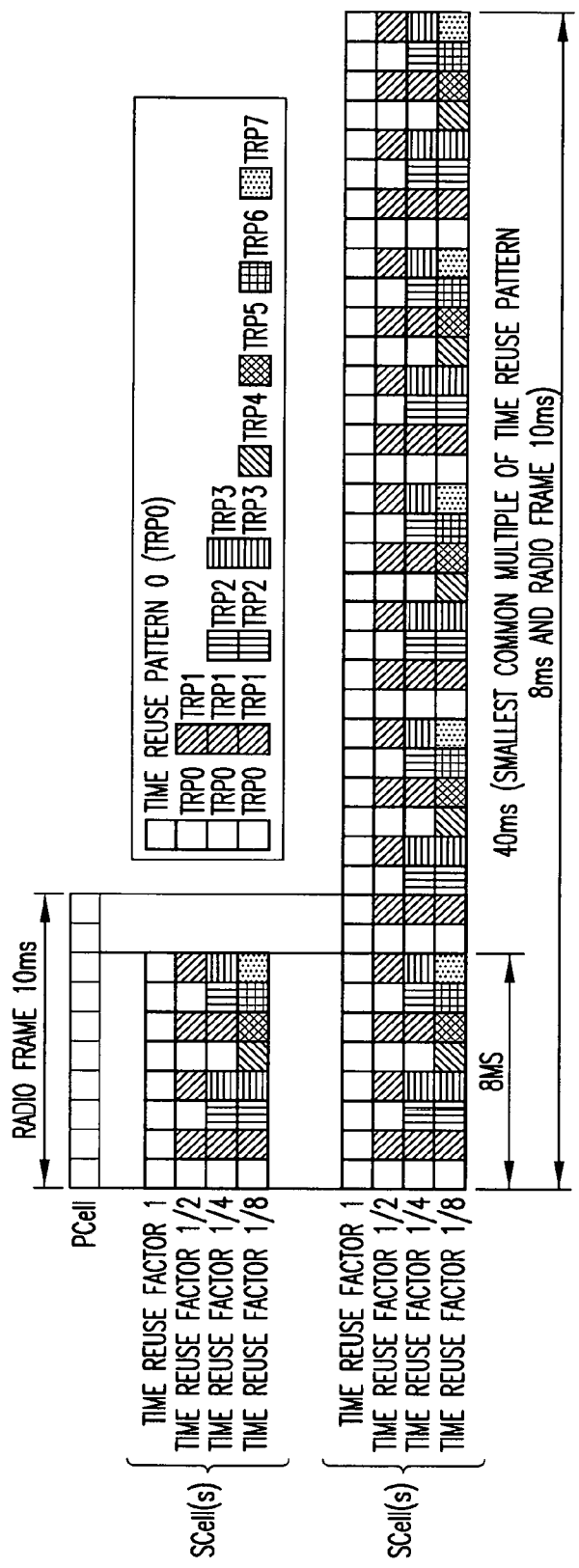
FIG. 4B shows time reuse factors and time reuse patterns (without time hopping) of the example in FIG. 4A according to certain embodiments of the invention.

According to an exemplary implementation of certain embodiments of the invention, the possible time reuse factors and time reuse patterns are predefined. This is illustrated in FIGS. 4A and 4B with PUCCH format 3 and with example time reuse factors {1, 0.5, 0.25, 0.125}. In the preferred embodiment, a higher time reuse factor is an integer multiple of a lower time reuse factor.

In particular, FIG. 4A shows an example of a PUCCH resource tree according to certain embodiments of the invention, and FIG. 4B shows time reuse factors and time reuse patterns (without time hopping) of the example in FIG. 4A according to certain embodiments of the invention.

Figure 5:
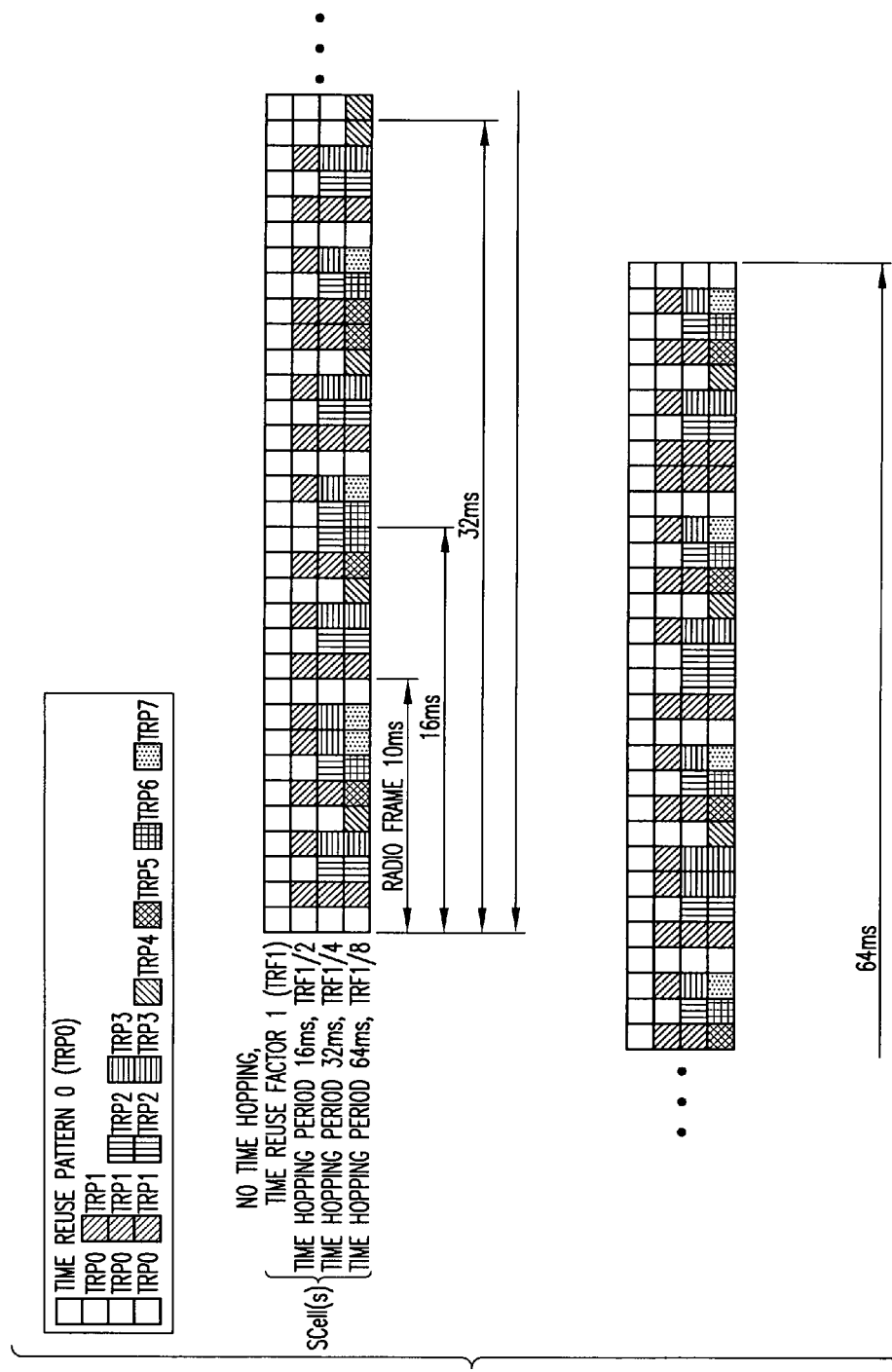
FIG. 5 shows an example of time reuse patterns with time hopping according to certain embodiments of the invention.

The time reuse patterns can be time hopping in order to allow better coexistence with discontinuous reception DRX, enhanced Inter-cell interference coordination eICIC, Multicast-broadcast single-frequency network MBSFN and broadcast in the SCell (s). The period of time hopping can be time reuse factor dependant. This is illustrated in FIG. 5 with example time hopping periods of {16, 32, 64} [ms]. In particular, FIG. 5 shows an example of time reuse patterns with time hopping according to certain embodiments of the invention.

In a preferred embodiment, a longer time hopping period is an integer multiple of a shorter time hopping period and the time reuse patterns of different time reuse factors are time synchronized.

The PUCCH resources can be organized in a tree. FIG. 4A shows an example of one tree with 5 PUCCH format 3 resources available in one PUCCH format 3 PRB (note: more or less resources can be considered by the tree, alternatively PUCCH F1bwcs resources/resource pairs can be considered by the tree).

Therein, the corresponding levels of the tree are created by lowering the time reuse factor.

Further, each element in a tree is uniquely associated with {PUCCH resource, time reuse pattern, time reuse factor} e.g. {A, 0, 1}.

Moreover, all elements on a given level are not colliding i.e. at least one of {PUCCH resource, time reuse pattern} is different across all elements on a given level e.g. {A, 0, 1} and {B, 0, 1}.

In the present embodiment, each requesting UE is allocated one element of the tree for a defined time duration. Thereby, different requesting UEs can have elements allocate on the same and/or on different levels of the tree.

According to certain embodiments, collisions across elements on different levels of the tree are avoided by not allocating the same PUCCH resource to UEs on different levels of the tree and/or (e.g. A allocated only on the time reuse factor 1 level and B allocated only on the time reuse factor ½ level) by not allocating any child element on any lower level if a parent element has been allocated on any higher level. Note: in this case it is possible to allocate to UEs the same PUCCH resource with different time reuse factors. For example, in FIG. 2 {E, 0, ¼} and {E, 2, ⅛} are allocated and are not colliding. This might be not possible if a higher time reuse factor is not an integer multiple of a lower time reuse factor. This might be not possible if time reuse patterns of different time reuse factors are not time synchronized. This might be not possible in case a longer time hopping period is not an integer multiple of a shorter time hopping period.

In the example of 4A, 21 UEs have {PUCCH resource, TRP, TRF} elements allocated.

According to certain embodiments, in a first step, all requesting UEs are allocated elements on a given tree level based on the number of requesting UEs. In a preferred embodiment, in the first step different UEs are primarily allocated to different tree levels based on a metric. The metric can consider the UE's requests to be scheduled on its SCell(s) and/or the UE buffer and/or the UE radio conditions and/or the load of the UE's SCell(s). If there is no suitable element found for a UE on this tree level, the next lower level is checked (downgrade).

In addition, the order of requesting UE for assignment of the PUCCH resources can be based on the above metric and/or based on the above metric to order the UEs of the same SCell and round robin or random to order SCells to avoid starving of some SCell(s) (which have a UE(s) with a relatively low metric).

Only the PUCCH resource/resource pair that is addressable for the UE via the PUCCH TPC command of the DCI (i.e. one of four resources/resource pairs configured by RRC) can be assigned to the UE.

In a second step, some or all assigned UEs can be upgraded to a higher tree level if it is possible (i.e. a UE can be upgraded to a higher level element if all of the child elements (including all lower levels) of this higher level element are not allocated to any other UE). The order of the upgrades can be based on the same above metric.

The above mentioned UE request of PUCCH resources can be understood as SCell(s) activation and/or periodical and/or event-based reassignment of resources to UEs with activated SCell(s) competing for the resources on the same PCell.

It shall be noted that the proposed invention is also applicable to PUCCH format 1bwcs with the following effects and observations compared to the application to PUCCH format 3:

In addition, each SCell can track the set of PUCCH resources assigned to the UEs of this SCell and overbook the resources for multiple UEs i.e. assign the same {PUCCH resource, time reuse pattern, time reuse factor} to more than one UE of this SCell. The collisions across such overbooked UEs are avoided by dynamic PUCCH resource value selection in each applicable TTI by the PUCCH TPC command of the DCI.

The present invention provides the following advantages compared to the prior art.

On the one hand, the invention is applicable to both PUCCH format 3 and PUCCH format 1bwcs. Further, the invention is applicable to a high number of SCells per PCell.

Further, the invention does not require fast communication between cells, and the invention reduces complexity/processing requirements.

On the other hand, SCell activation blocking due to lack of PUCCH resources can be avoided, and high number of UEs can be supported.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:
3GPP The 3rd Generation Partnership Project
ACK Positive Acknowledgment
CA Carrier Aggregation
DCI Downlink Control Information
DL Downlink
DRX Discontinuous Reception
eICIC Enhanced Inter-cell Interference Coordination
F1bwcs Format 1b with Channel Selection
F3 Format 3
FD Frequency Domain
L1 Layer 1
L2 Layer 2
L3 Layer 3
LTE Long Term Evolution
LTE-A Long Term Evolution Advanced
MBSFN Multicast-broadcast Single-frequency Network
NACK Negative Acknowledgment
PCell Primary Cell
PDCCH Physical Downlink Control Channel
PUCCH Physical Uplink Control Channel
PRB Physical Resource Block
Rel Release
RRC Radio Resource Control
SCell Secondary Cell
TD Time Domain
TPC Transmit Power Control
TRF Time Reuse Factor
TRP Time Reuse Pattern
TTI Transmission Time Interval
UE User Equipment
UL Uplink

What is claimed is:

1. A method, comprising:
  managing control channel usage in carrier aggregation, the managing comprising:
  defining a time reuse factor and a time reuse pattern for a physical uplink control channel resource on a primary cell for enabling time multiplexing the subframes of the resource; and
  assigning a physical uplink control channel resource element to a requesting user equipment by using colliding resources in different subframes,
  wherein the time reuse factor and the time reuse pattern are variably set based on at least one of the number of requesting user equipments and the individual traffic needs of the requesting user equipment.

2. The method according to claim 1, wherein a higher time reuse factor is an integer multiple of a lower time reuse factor.

3. The method according to claim 1, wherein each physical uplink control channel resource element is uniquely associated with a physical uplink control channel resource, a predefined time reuse pattern and a time reuse factor.

4. The method according to claim 3, wherein the time reuse patterns are preset so as to enable time hopping, wherein the period of time hopping is time reuse factor dependent or independent of the time reuse factor.

5. The method according to claim 4, wherein a longer time hopping period is an integer multiple of a shorter time hopping period, and the time reuse patterns of different time reuse factors are time synchronized.

6. The method according to claim 1, wherein the physical uplink control channel resources are organized in a tree structure, wherein
  the corresponding levels of the tree are created by lowering the time reuse factor;
  each element in the tree is uniquely associated with a physical uplink control channel resource, a predefined time reuse pattern and a time reuse factor, and at least one of physical uplink control channel resource and time reuse pattern is different across all elements on a given level;
  each requesting user equipment is allocated to one element of the tree for a defined periodic and/or event based time duration; and
  different requesting user equipments have elements allocated on the same and/or on different levels of the tree.

7. The method according to claim 6, wherein collisions across elements on different levels of the tree are avoided
  by prohibiting allocating the same physical uplink control channel resource to user equipments on different levels of the tree; and/or
  by prohibiting allocating any child element on any lower level if a parent element has been allocated on any higher level.

8. The method according to claim 6, wherein different user equipments are primarily allocated to different tree levels based on a metric,
  the metric considers at least one of requests of a number of the user equipments to be scheduled on its secondary cell(s), the user equipment buffer, the user equipment radio conditions, the load of the user equipment's secondary cell(s), and
  if there is no suitable element found for a user equipment on this tree level, the next lower level is checked.

9. The method according to claim 6, wherein some or all assigned user equipments are upgraded to a higher tree level if all of the child elements including all lower levels of this higher level element are not allocated to any other user equipment.

10. The method according to claim 1, wherein the method is applicable to physical uplink control channel format 3 and physical uplink control channel format 1b with channel selection.

11. An apparatus, comprising:
  at least one processor, and
  at least one memory for storing instructions to be executed by the processor,
  wherein the at least one memory and the instructions are configured to, with the at least one processor, cause the apparatus at least to perform:

managing control channel usage in carrier aggregation, the managing comprising:

defining a time reuse factor and a time reuse pattern for a physical uplink control channel resource on a primary cell for enabling time multiplexing the subframes of the resource; and assigning a physical uplink control channel resource element to a requesting user equipment by using colliding resources in different subframes, wherein the time reuse factor and the time reuse pattern are variably set based on at least one of the number of requesting user equipments and the individual traffic needs of the requesting user equipment.

12. The apparatus according to claim 11, wherein a higher time reuse factor is an integer multiple of a lower time reuse factor.

13. The apparatus according to claim 11, wherein each physical uplink control channel resource element is uniquely associated with a physical uplink control channel resource, a predefined time reuse pattern and a time reuse factor.

14. The apparatus according to claim 13, wherein the time reuse patterns are preset so as to enable time hopping, wherein the period of time hopping is time reuse factor dependent or independent of the time reuse factor.

15. The apparatus according to claim 14, wherein a longer time hopping period is an integer multiple of a shorter time hopping period, and the time reuse patterns of different time reuse factors are time synchronized.

16. The apparatus according to claim 11, wherein the physical uplink control channel resources are organized in a tree structure, wherein the corresponding levels of the tree are created by lowering the time reuse factor;

each element in the tree is uniquely associated with a physical uplink control channel resource, a predefined time reuse pattern and a time reuse factor, and at least one of physical uplink control channel resource and time reuse pattern is different across all elements on a given level;

each requesting user equipment is allocated to one element of the tree for a defined periodic and/or event based time duration; and different requesting user equipments have elements allocated on the same and/or on different levels of the tree.

17. The apparatus according to claim 16, wherein collisions across elements on different levels of the tree are avoided by prohibiting allocating the same physical uplink control channel resource to user equipments on different levels of the tree; and/or by prohibiting allocating any child element on any lower level if a parent element has been allocated on any higher level.

18. The apparatus according to claim 16, wherein different user equipments are primarily allocated to different tree levels based on a metric, the metric considers at least one of requests of a number of the user equipments to be scheduled on its secondary cell(s), the user equipment buffer, the user equipment radio conditions, the load of the user equipment's secondary cell(s), and if there is no suitable element found for a user equipment on this tree level, the next lower level is checked.

19. The apparatus according to claim 16, wherein some or all assigned user equipments are upgraded to a higher tree level if all of the child elements including all lower levels of this higher level element are not allocated to any other user equipment.

20. The apparatus according to claim 11, wherein the managing control channel usage is applicable to physical uplink control channel format 3 and physical uplink control channel format 1b with channel selection.

21. A computer program product comprising a non-transitory computer-readable medium on which software code portions are stored, wherein the software code portions of the computer-readable medium are directly loadable into the internal memory of a computer and cause the computer to perform at least the following:

managing control channel usage in carrier aggregation, the managing comprising:

defining a time reuse factor and a time reuse pattern for a physical uplink control channel resource on a primary cell for enabling time multiplexing the subframes of the resource; and assigning a physical uplink control channel resource element to a requesting user equipment by using colliding resources in different subframes, wherein the time reuse factor and the time reuse pattern are variably set based on at least one of the number of requesting user equipments and the individual traffic needs of the requesting user equipment.

\* \* \* \* \*